US008817285B2

United States Patent
Tanabe et al.

(10) Patent No.: US 8,817,285 B2
(45) Date of Patent: Aug. 26, 2014

(54) METHOD AND APPARATUS FOR PRINTING HTML CONTENT

(71) Applicant: ZIH Corp., Lincolnshire, IL (US)

(72) Inventors: Brian Tanabe, Lake Forest, IL (US); Eric A Nudel, Lake Forest, IL (US); Ethan Hall, Chicago, IL (US)

(73) Assignee: ZIH Corp., Lincolnshire, IL (US)

( * ) Notice: Subject to any disclaimer, the term of this patent is extended or adjusted under 35 U.S.C. 154(b) by 43 days.

(21) Appl. No.: 13/727,887

(22) Filed: Dec. 27, 2012

(65) Prior Publication Data

US 2014/0185072 A1    Jul. 3, 2014

(51) Int. Cl.
     *G06F 3/12*      (2006.01)

(52) U.S. Cl.
     USPC ............ 358/1.13; 358/1.1; 715/236; 715/239

(58) Field of Classification Search
None
See application file for complete search history.

(56) References Cited

U.S. PATENT DOCUMENTS 6,822,663 B2 * 11/2004 Wang et al. .................... 715/854
2002/0083068 A1 * 6/2002 Quass et al. .................. 707/100

* cited by examiner

*Primary Examiner* — Paul F Payer
(74) *Attorney, Agent, or Firm* — Alston & Bird LLP

(57) ABSTRACT

A method, apparatus, and computer program product are described herein for generating printer commands for controlling a printing device, based on HTML. More specifically, the example embodiments of the system described herein provide for receiving HTML representing a label that comprises, in some examples, a barcode or other print content, transforming the HTML to a printer control language, and rasterizing the image on a printing device in preparation for printing, all while preserving barcode print quality and high speed printing and scanning.

33 Claims, 6 Drawing Sheets

Zebra Custom
Applications Group

*ZEBRACUSTOMAPPLICATIONSGROUP*

Zebra Custom
Applications Group

*ZEBRACUSTOMAPPLICATIONSGROUP*

Zebra
Custom Applications Group

METHOD AND APPARATUS FOR PRINTING HTML CONTENT

BACKGROUND

Various embodiments of the invention are related to printing devices, and particularly to a method and apparatus for generating printer commands for controlling a printer, based on Hypertext Markup Language (HTML). Applicant has identified a number of deficiencies and problems associated with the printing of labels or other media on printers. Through applied effort, ingenuity, and innovation, Applicant has solved many of these identified problems by developing a solution that is embodied by the present invention, which is described in detail below.

BRIEF SUMMARY

A method, apparatus, and computer program product are therefore provided for generating printer commands for controlling a printing device, based on HTML. More specifically, the example embodiments of the system described herein provide for receiving HTML source code, that when rendered in a browser represents a label that comprises, in some examples, a barcode or other print content, transforming the HTML to a printer control language, and rasterizing the image on a printing device in preparation for printing, all while preserving barcode print quality and high speed printing and scanning. The system, in some examples, may be particularly beneficial to users wanting to print labels and other content by providing conventional HTML, which may be easier and cheaper to produce compared to conforming an enterprise system to the specifications of device-specific print drivers.

A method is provided for converting received Hypertext Markup Language (HTML) that specifies content to be printed by a printing device to Extensible Hypertext Markup Language (XHTML), wherein at least one element in the XHTML is assigned an element identifier. The method further includes generating style information, based on an Extensible Stylesheet Language (XSL) template, for at least one element in the XHTML, wherein the style information is stored in a format object tree and associated with the XHTML via the element identifier. Additionally, the method includes extracting placement information from the format object tree for at least one element, wherein the placement information is stored in an XML placement document and is associated with the XHTML via the element identifier. The method further includes generating at least one printer command that incorporates, based on the element identifier, the content from the XHTML, style information from the formatting object tree, and placement information from the XML placement document, wherein execution of the at least one printer command by a printing device results in rasterization of the content in the style specified by the HTML, and in the position inferred from the HTML.

In some embodiments, the at least one printer command is generated remotely from the printing device, and the method further comprises transmitting the at least one printer command to the printing device. In other embodiments, the at least one printer command is generated on the printing device, and the method further comprises transmitting the HTML to the printing device.

In some embodiments, the placement information comprises at least one coordinate pair identifying a position on a two-dimensional axis and is interpretable by the printer control language.

In some embodiments, parsing the XHTML into the printer control language to generate the at least one printer command comprises referencing a custom element type in a lookup table to identify at least one command in the printer control language and associated with the element type. In some embodiments, the method further comprises receiving content to be printed by a printing device in a format specified by the HTML.

In some embodiments, the method further comprises detecting at least one element type indicating that the content includes a barcode, identifying at least one barcode characteristic based on the XHTML, and referencing a barcode lookup table to generate style information based on the at least one barcode characteristic, wherein printing of the barcode content using the style information results in printing of the barcode. In some embodiments, the at least one barcode characteristic is at least one of a barcode type, a barcode width, and a barcode height.

In some embodiments, the method includes generating an XHTML output file including absolute placement information, and receiving a change in absolute placement information, provided by a user, for at least one element, in the form of subsequently received HTML.

An apparatus is also provided, the apparatus comprising processing circuitry configured to cause the apparatus to at least convert received Hypertext Markup Language (HTML) that specifies content to be printed by a printing device, to Extensible Hypertext Markup Language (XHTML), wherein at least one element in the XHTML is assigned an element identifier, generate style information, based on an Extensible Stylesheet Language (XSL) template, for at least one element in the XHTML, wherein the style information is stored in a format object tree and associated with the XHTML via the element identifier, extract placement information from the format object tree for at least one element, wherein the placement information is stored in an XML placement document and is associated with the XHTML via the element identifier, and generate at least one printer command that incorporates, based on the element identifier, the content from the XHTML, style information from the formatting object tree, and placement information from the XML placement document, wherein execution of the at least one printer command by a printing device results in rasterization of the content in the style specified by the HTML, and in the position derived from the HTML.

A computer program product is also provided, comprising at least one non-transitory computer-readable medium having computer-readable program instructions stored therein, the computer-readable program instructions comprising instructions, which when performed by an apparatus, are configured to cause the apparatus to at least convert received Hypertext Markup Language (HTML) that specifies content to be printed by a printing device, to Extensible Hypertext Markup Language (XHTML), wherein at least one element in the XHTML is assigned an element identifier, generate style information, based on an Extensible Stylesheet Language (XSL) template, for at least one element in the XHTML, wherein the style information is stored in a format object tree and associated with the XHTML via the element identifier, extract placement information from the format object tree for at least one element, wherein the placement information is stored in an XML placement document and is associated with the XHTML via the element identifier, generate at least one printer command that incorporates, based on the element identifier, the content from the XHTML, style information from the formatting object tree, and placement information from the XML placement document, wherein execution of the at least one printer command by a printing device results in rasterization of the content in the style specified by the HTML, and in the position derived from the HTML.

BRIEF DESCRIPTION OF THE DRAWINGS

Figure 1:
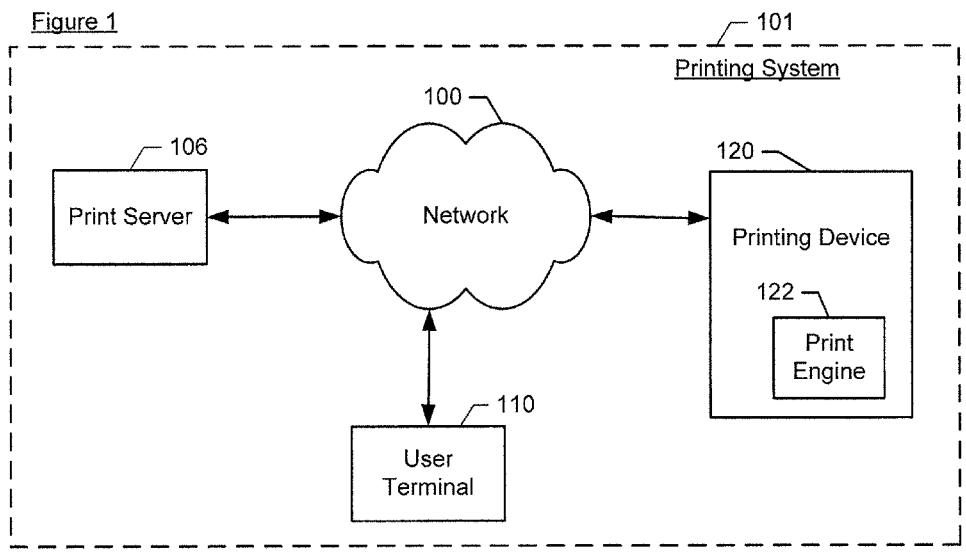
Figure 2:
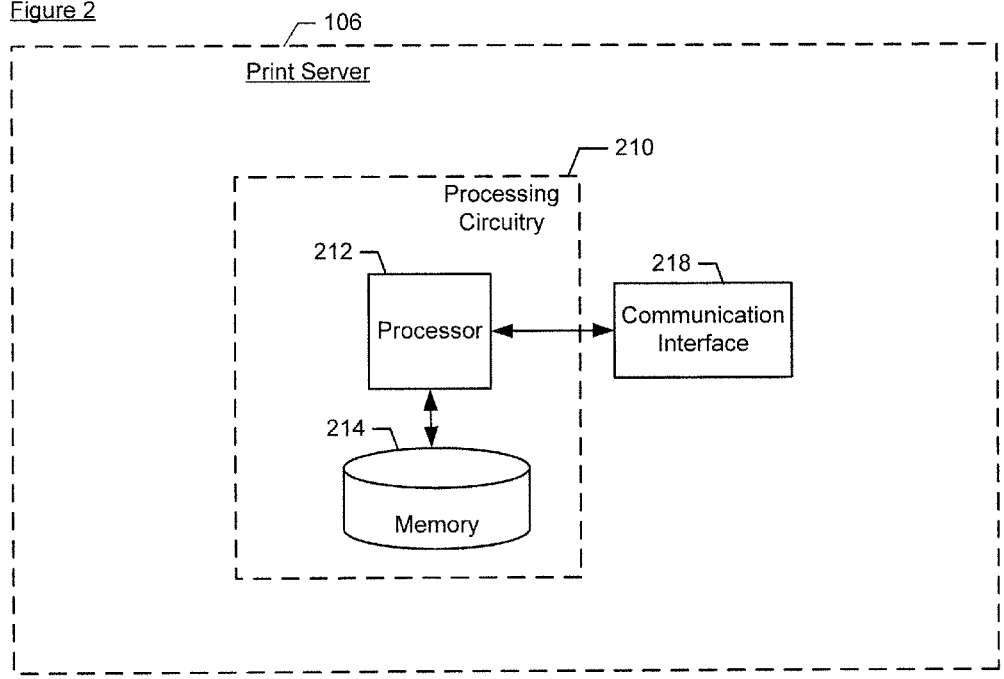
Figure 3:
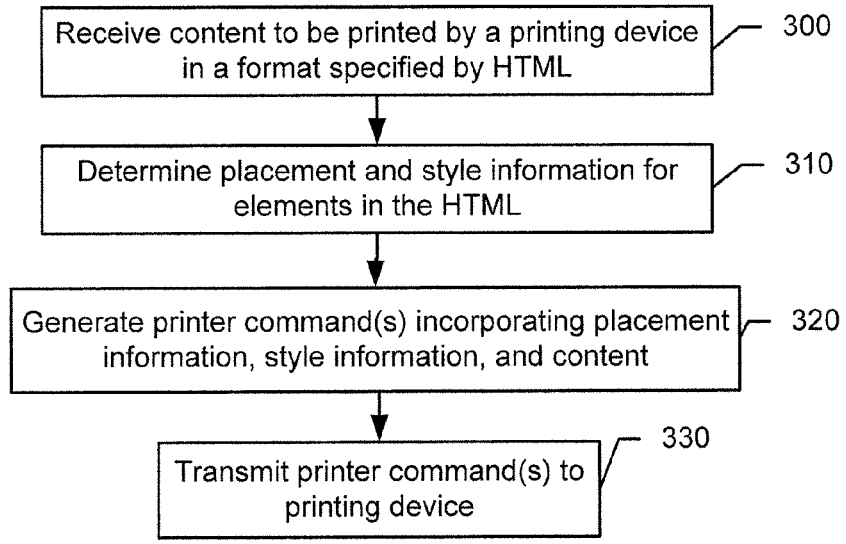
Figure 4:
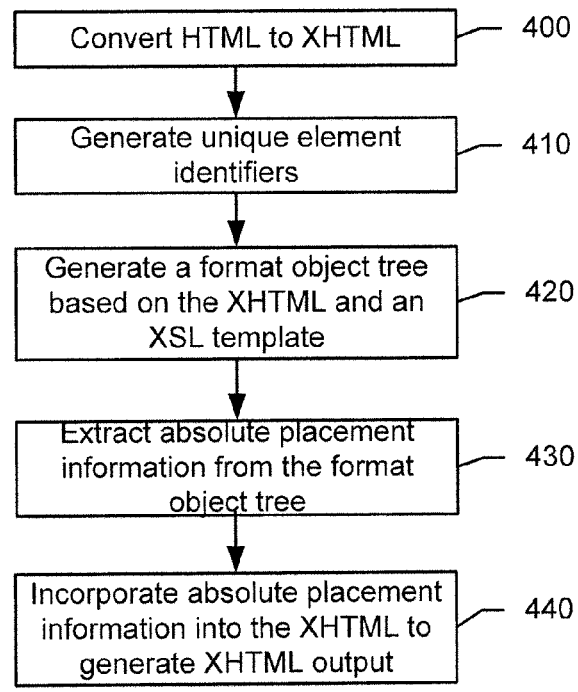
Figure 5:
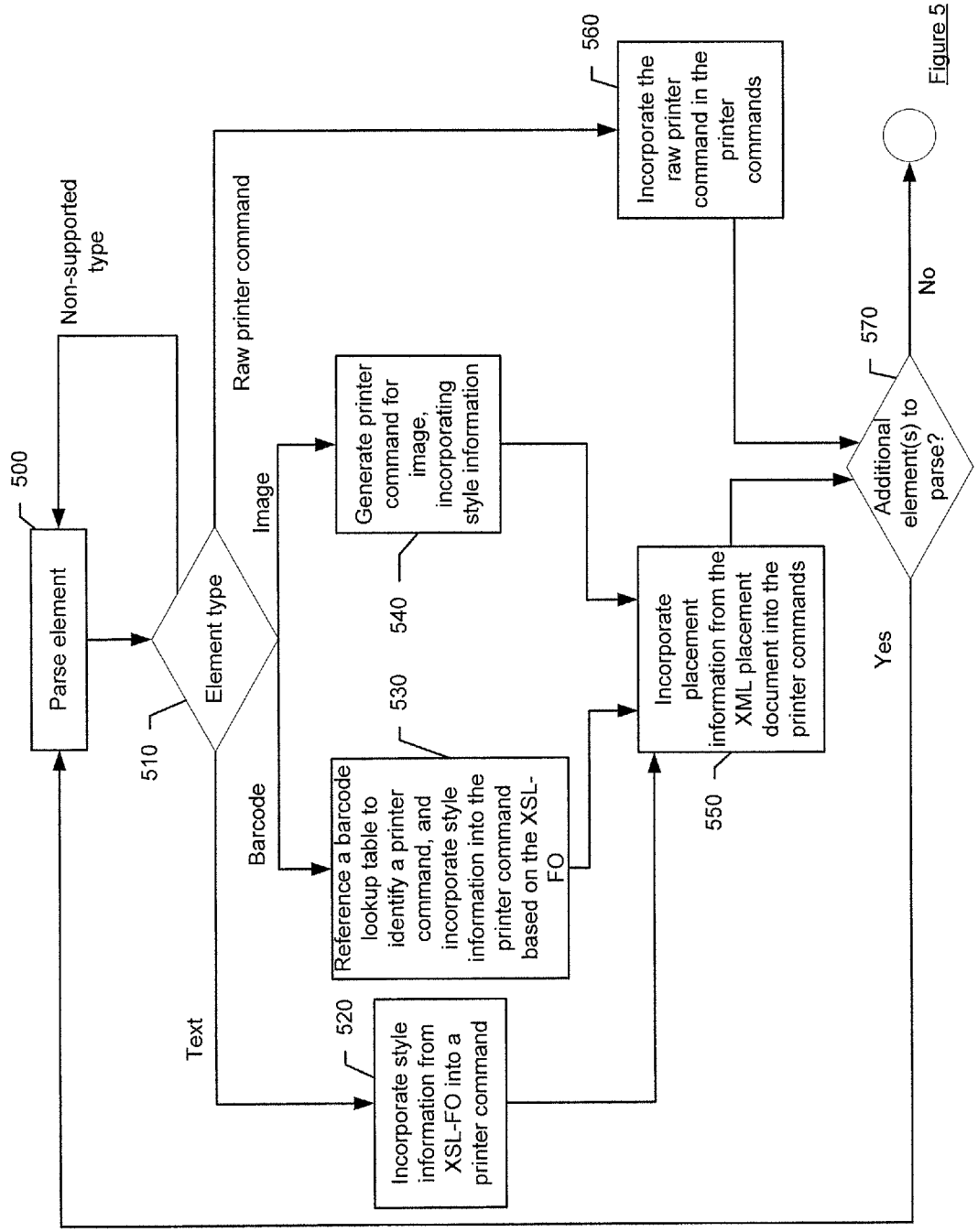
Figure 6:
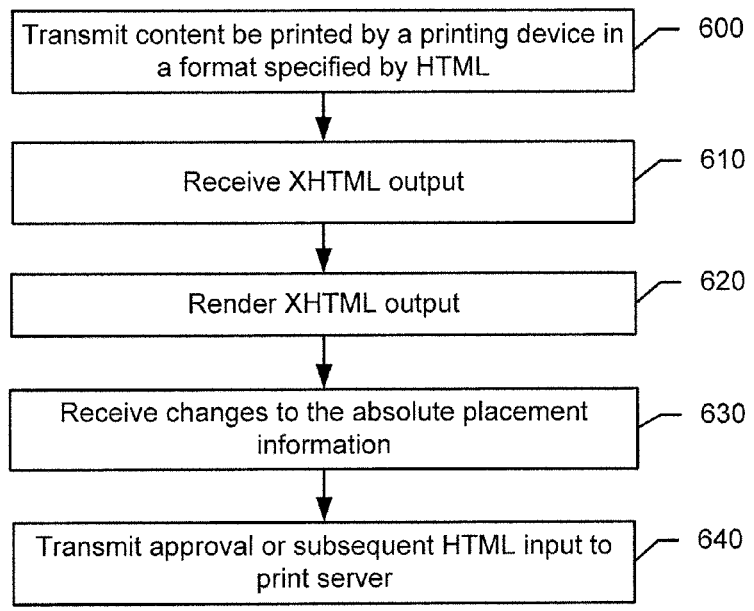
Figure 7:
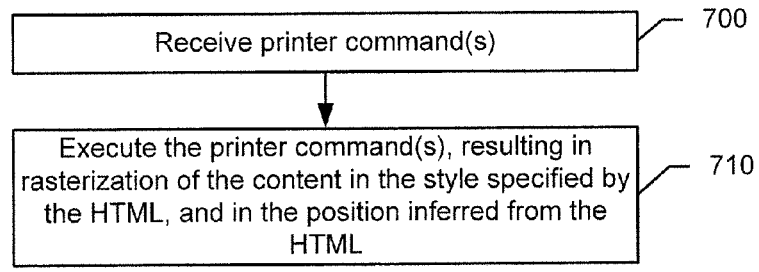
Figure 8:
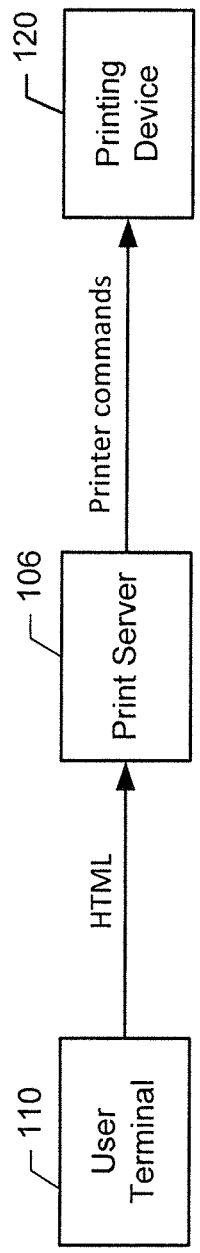
Figure 9:
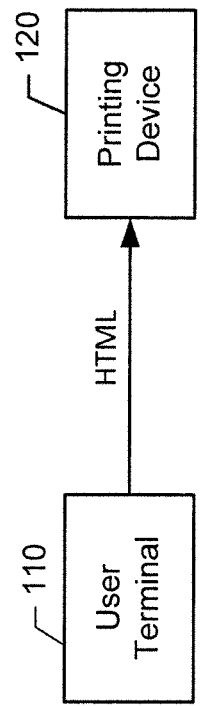
Figure 10:
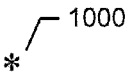
Figure 11:
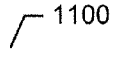
Figure 12:

Having thus described certain example embodiments of the present invention in general terms, reference will hereinafter be made to the accompanying drawings which are not necessarily drawn to scale, and wherein:

FIG. 1 is a block diagram of a printing system according to an example embodiment;

FIG. 2 is a block diagram of a print server according to an example embodiment;

FIG. 3 is a flowchart illustrating operations for generating printer commands for controlling a printing device, based on HTML, according to an example embodiment;

FIG. 4 is a flowchart illustrating operations for incorporating placement information, style information and content into printer commands;

FIG. 5 is a flowchart illustrating operations to generate printer commands using a parsing method according to an example embodiment;

FIG. 6 is a flowchart illustrating operations to be performed by a user terminal according to an example embodiment;

FIG. 7 is a flowchart illustrating operations to be performed by a printing device according to an example embodiment;

FIGS. 8 and 9 are block diagrams of example configurations of a printing system according to an example embodiment;

FIG. 10 is an example HTML browser rendering;

FIG. 11 is an example XHTML rendering provided by a printer-specific rendering tool; and FIG. 12 is an example printed image according to example printer command(s) according to one embodiment.

DETAILED DESCRIPTION

Some embodiments will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

In some examples, barcodes may be added to labels on packages, machine components, and other items as an example method for tracking and identifying inventory or other products during manufacture, distribution, shipping and/or other processes. The delicate nature of the barcode scanner requires the barcode be printed at high quality, free of blurred images, stray dots, or bleeding. Scanning devices capable of scanning barcodes at speeds of thirty miles per hour will prove beneficial only if barcode readability is maintained. Stopping a process or machine to manually input an identifier associated with the barcode will likely reduce any benefits gained by using a high-speed scanner. Therefore, the precision of a printed barcode is, for example, essential to realizing the benefits of a high-speed scanner.

Many businesses currently utilize enterprise systems for generating labels having barcodes. In some examples, and in an instance in which the label is printed, a representation of the label may be rasterized, as an image, on a terminal or print server, by a locally installed print driver, and transmitted to a printing device. The rasterized bitmap may indeed provide a high-quality image of the precision needed by scanning devices to interpret the barcode; however, raster images are generally large in size relative to other file formats. Print servers and drivers capable of processing print requests and generating bitmaps or images in other raster formats may be capable of producing a quality barcode image, but the high latency associated with transmitting the raster images to printing devices, particularly in high volume print jobs, could impede the process and reduce the benefits provided by a high-speed printer.

A label generating system may provide a means for a user to provide information, whether manually or through an automated process, such as serial numbers or other pertinent information, to be encoded into a barcode on a label. Such a system may produce or otherwise XHTML output in order for a user to easily view the label in a web browser prior to printing. It may not be practical or feasible, however, for the barcode to be printed at a user terminal, but rather on a specialty printing device specifically designed for printing the type of barcode or label on the specified type of media.

Therefore and according to some examples, the HTML used to render the label in a browser may be used as the input to the print process. However, instead of rasterizing an image of the HTML on the user terminal, the user terminal, a print server, or the like may be configured to convert the HTML to device-specific instructions (e.g., printer commands) requiring less bandwidth than a rasterized image and transmit the device-specific instructions to the printing device. The printing device may then use the device-specific instructions to rasterize and/or print the image. As such, a certain level of efficiency may be maintained by the transmission of smaller files, while still providing the required precision in the label. Alternatively and/or additionally, in some example embodiments, by enabling the printing device to perform the rasterization, the printer can process the print commands and adjust various setting to ensure a high quality label is produced that contains a barcode that is scannable with a high level of reliability as opposed to the quality of barcode that can be produced when the printer simply receives an image for printing.

When HTML is rendered by a web browser, placement of elements is inferred (e.g., position and style are estimated by a processor) by a combination of the type of element attempting to be rendered, its parent element(s), and any Cascading Style Sheet (CSS) information specific to the rendered element, its parent(s), or the entire page. Therefore, placement of an element in a browser rendering depends on the element's disposition within an HTML document as a whole and is largely impacted by other elements in the document. In order for a printing device to print various elements in the correct location on a media, and in the correct style and size, the printing device may require the printer commands be provided such that the printer can process the commands sequentially (e.g., line by line, or pixel by pixel). In other words, the printer must receive printer commands that are more procedural in nature than HTML.

As such, to provide a method that will receive HTML as an input and result in a printed product resembling the image rendered in a web browser, the inferred placement information may be processed to calculate absolute placement information (e.g., a coordinate pair) that the printer can interpret to print the elements in the proper locations. Similarly, formatting information, such as style and placement information specific to an individual element may be processed and translated to a form that the printing device can recognize and properly incorporate into the rasterized or printed image.

FIG. 1 is a block diagram of a printing system 101 according to some example embodiments. In some embodiments, printing system 101 may include any number of user terminals 110, which may be configured to communicate with printing device 120 and/or print server 106 (described in further detail hereinafter with respect to FIG. 2), over network 100. User terminal 110 may be embodied by any type of user device, such as a personal computer, laptop, mobile device, or the like. In some embodiments, user terminal 110 may be implemented on the same apparatus as the printing device 120. In other example embodiments, the user terminal 110 may embody the print server 106. The user terminal 110 may be used to initiate a print request, or provide HTML to the print server 106 and/or printing device 120 as described herein. In some embodiments, the user terminal 110 may run software capable of producing HTML representing a label that comprises a barcode, text, image or the like. In some example embodiments, the software may be label generating software that is configured to accept and/or otherwise enter product orders that result in the generation of a shipping label. Advantageously, in some examples, the user terminal 110 may therefore be used to render the HTML in a web browser, providing an initial preview of the label that is to be printed.

According to some embodiments, the user terminal 110 may additionally be used for overriding or refining absolute placement information generated for the purposes of printing the label (e.g., converting the HTML to printer commands) by the user terminal 110, the print server 106 or the like. To accomplish this, the user terminal 110 may receive, via network 100, XHTML incorporating calculated absolute placement information, such as by the print server 106, and may then render the XHTML in a display, by use of a printer-specific rendering tool, thereby providing a more accurate print preview, or test image, to a user. The preview process is described in further detail with respect to the operations of FIG. 6.

Printing system 101 may include any number of printing devices 120, which may be embodied as a thermal printer, inkjet printer, laser printer, or the like, and may be configured to rasterize a printable image based the printer commands that are generated based on the HTML. In this regard, rasterizing may be considered generating a bitmap image for printing, or printing the image, based on the printer command(s). As such, the printing device 120, advantageously, may rasterize the printable image based on internal settings, current status, constraints and/or the like.

The printing device 120 may be a stand-alone unit, such as a desktop printer, an industrial printer, a card printer or a mobile printer, or may be integrated into a larger apparatus, such as a kiosk, a point of sale system, or the like. According to various example embodiments, the printing device 120 may include a print engine 122 responsible for controlling various components of the printing device 120 based on print commands given in a pre-defined printer control language. In this regard, a printer control language may be a proprietary language defining a required format and syntax for printing content by a printing device 120. The printer control language may be procedural in nature, and may be interpreted by the print engine 122 to control various components of the printing device 120. For example, the printer control language may include commands for controlling placement and registration of the media relative to a printhead, temperatures in thermal printers, print speeds and media movement, and other various functions that may be essential to producing the desired printed output. An example of a printer control language is Zebra Programming Language (ZPL), referred to and described to in more detail, by example, hereinafter.

In embodiments utilizing a print server 106, the print server may be configured to receive HTML, transform the HTML into printer commands and provide printer commands in a printer control language, to the printing device 120 via network 100. In this regard, the print server 106 may process the inferred placement and style information in the HTML to generate the absolute placement and style information, in the printer control language, as required by the printing device 120. These processes are described in more detail with respect to FIGS. 3, 4, and 5. It will be appreciated that although the print server 106 is referred to frequently herein, other embodiments may be implemented such that a print server 106 is embodied by or otherwise operating on the user terminal 110 or the printing device 120.

As described above, network 100 may be used for transmitting data across various components of the printing system 101. Network 100 may be embodied in a local area network, the Internet, any form of a wireless or wired network, or any combination thereof. In some embodiments, the print server 106, printing device 120, and/or the user terminal 110 may be directly connected.

FIG. 2 is a block diagram of a print server according to an example embodiment. Print server 106 may be embodied as an individual terminal or server cluster. Print server 106 may include processing circuitry 210, configured to perform operations in accordance with one or more example embodiments disclosed herein. In some embodiments, the processing circuitry 210, may be embodied as or comprise a circuit chip. The circuit chip may constitute means for performing one or more operations for providing the functionalities described herein.

In some example embodiments, the processing circuitry 210 may include a processor 212 and, in some embodiments, such as is illustrated in FIG. 2, may further include memory 214. The processing circuitry 210 may be embodied as a circuit chip (e.g., an integrated circuit chip) configured (e.g., with hardware, software, or a combination of hardware and software) to perform operations described herein. Processor 212 may perform some or all of the processing functionalities introduced above and described in further detail hereinafter. Memory 214 may be utilized for storage of data, such as placement information, style information, and content used to formulate printer commands. Processor 212 may store and access this data, as needed, while performing the various operations.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of the print server 106 as described herein. The plurality of processors may be embodied on a single computing device or distributed across a plurality of computing devices. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices collectively configured to function as the print server 106. The memory 214 may be configured to store information, data, applications, instructions and/or the like for enabling the print server 106 to carry out various functions in accordance with one or more example embodiments. For example, the memory 214 may be configured to track element identifiers for each element provided in the HTML, as well as placement and style information for each element. As described herein, various file manipulations may be performed to provide placement and style information in intermediary data sets, which may be stored on memory 214. The memory 214 may be additionally configured to buffer input data for processing by the processor 212. Additionally or alternatively, the memory 214 may be configured to store instructions for execution by the processor 212. As yet another alternative, the memory 214 may include one or more databases that may store a variety of files, contents, or data. Among the contents of the memory 214, applications may be stored for execution by the processor 212 to carry out the functionality associated with each respective application.

The communication interface 218 may include one or more interface mechanisms for enabling communication over a network. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable print server 106 to communicate with printing device 120 and/or user terminal 110 via network 100. HTML may be received, from the user terminal 110 and over network 100, by the communication interface 218. Following processing of the HTML, the resulting printer commands may be transmitted from printer server 106, by communication interface 218 and over network 100, to the printing device 120. Accordingly, the communication interface 218 may, for example, include supporting hardware and/or software for enabling communications via cable, digital subscriber line (DSL), universal serial bus (USB), Ethernet, or other methods.

As described above, some embodiments may not necessarily include a print server 106. In some embodiments, the components illustrated in and described with respect to FIG. 2, may be implemented on the user terminal 110, and consequentially, some or all of the processing functionalities described herein may be performed by the user terminal 110.

Having now described various components of example embodiments, the operations of these components according to example embodiments are provided with respect to FIGS. 3-5. FIG. 3 is a flowchart illustrating operations for generating printer commands for controlling a printing device based on HTML that describes the contents of a label to be printed, according to an example embodiment. The print server 106 may include means, such as communication interface 218, for receiving content to be printed by printing device 120 in a format specified by HTML, as shown by operation 300. The format may include embedded style information and placement information. In this regard, the print server 106 may receive an HTML file(s) from user terminal 110, via network 100. The HTML file(s) may be considered a print request initiated by, for example, a user of user terminal 110 or some batch or otherwise automated process for producing labels, other printed content, or the like, and may be stored on memory 214.

With reference to operation 300, the following is an example HTML file that may be input in operation 300 ("HTML input"):

```
1) <html>
2)    <head></head>
3)    <body style="width:3.17in; height:2.12in; margin:1px;
       padding:0px; font-family: 'MyriadSet-Text'; font-size:9pt;
       margin-left:.25in;">
4)       <div id="content_holder" style="width:202px;
         height:117px">
5)          <span style="font-weight:bold; font-
         size:36px;">Zebra</span>
6)          <span style="font-weight:bold; font-
         size:20px;">Custom Applications Group</span>
7)       </div>
8)       <div id="barcode_holder" style="width:600px;
         height:60px">
9)          <div id="barcode" style="font-
         family:Code39SmallHigh; font-size:36px; width:600; padding-
         bottom:1px;">*ZEBRACUSTOMAPPLICATIONSGROUP*</div>
10)      </div>
11)   </body>
12) </html>
```

It should be noted that the above line numbers have been added for purposes of referring to the HTML code and should not be interpreted as being part of the HTML code set forth above. Lines 1-8 include HTML that may be used to render the content of the label in a web browser to display content as specified by the tags and attributed of the HTML. In some examples, the HTML may include a custom element that identifies an image, barcode or the like to be displayed. For example, Line 9 of the HTML input provides a custom element with the id "barcode." Such an element may cause the literal content of the custom element to be rendered, see for example in FIG. 10, element 1000. Additionally or alternatively, in some embodiments, a browser may identify a font associated with a barcode (e.g., font-family: Code39SmallHigh), and use the font to generate an image that substantially represents a printed barcode (not depicted in FIG. 10). As will be described in further detail with regard to operation 530, the custom element may be adapted or otherwise transformed by the print server 106 so as to provide for printing of an actual barcode by identifying the custom element and incorporating the appropriate placement, style information and printer command(s).

As is described herein, the HTML may be generated or otherwise previewed on a user terminal 110 prior to transmitting the print request. For example, a user may view the label, when rendered in a web browser (see e.g., FIG. 10), and receive an initial preview of the image to be printed. Advantageously, in some examples, the method described with respect to FIG. 3 may provide for conversion of the HTML input, as it is rendered in the web browser, into printer command(s) comprising instructions, that when executed by the printing device 120, produce a printed label.

Continuing to operation 310, absolute placement information and style information for the elements appearing in the HTML input may be generated, such as by the processor 212, to enable the processor 212 to convert the elements into printer commands. As described above, because placement of HTML elements is inferred by a browser, placement information needs to be defined for a procedural printer control language and for the generation of printer commands. Processor 212 may process the elements in the HTML, and convert the inferred placement and style information derived from the HTML into XML, for example to prepare for compilation of the information into printer command(s).

The style information and placement information may be linked to an element with a unique element identifier (element ID) so that the style and placement can be properly associated with the content when formulating the printer command(s). As the inferred placement information is processed to produce absolute placement information, the element ID may be associated with the absolute placement information to provide a means for referencing the correct placement information while formulating the printer commands based on the elements as is shown in FIG. 5. As such, the style information for each element may also be generated in a separate, or in some embodiments, asynchronous process, and assigned the corresponding element ID. This will allow for subsequent linkage of the placement information and style information to the content to be printed. The process of generating absolute placement information and style information is described in further detail with respect to FIG. 4.

As shown by operation 320, the print server 106 may include means, such as processor 212, for generating printer command(s) incorporating placement information, style information and content of an element. The processor 212 may link together the content, style information, and placement information based on the element IDs generated with respect to operation 310.

In some example embodiments, each element may be processed and the associated placement, style, and content may be included in or otherwise influence generation of the printer command(s). Individual printer commands may be appended, or otherwise incorporated into a set of printer commands, that when executed in their entirety by printing device 120, print a label resembling an output created by rendering the HTML in a web browser. Operation 320 is described in more detail with respect to FIG. 5.

Example printer commands generated in ZPL based on the placement information, style information, and content, are provided below: ^XA^CI28^PW639^FT528,75^A@R,150, 150,E:MYRDREG.ttf^FDZebra^FS^FT639,0^A@R,37,37, E:MYRDREG.ttf^FD^FS^FT430,75^A@R,83,83,E:MYR-DREG.ttf^FD Custom Applications Group^FS^FT114, 75^BY2,3.0^B3R,N,250,N,
N^FD*ZEBRACUSTOMAPPLICATIONSGROUP*^FS^XZ The printer command(s) may be generated such that execution of the at least one printer command by the printing device 120 results in printing of the content in the format specified by the HTML input and in the position inferred from the HTML input. As such, the execution of the printer command(s) result in a printed product resembling an output created by rendering the HTML in a web browser. The printing device 120 utilizes the formulated placement and style information, linking it to content based on element ID, and incorporated in the printer command(s), to control the printer and replicate the rendered HTML in a printed format.

Continuing to operation 330, the printer command(s) may be transmitted, via communication interface 218 and network 100, for example, to the printing device 120. In some embodiments, the printer command(s) may be transmitted from the user terminal 110 to printing device 120.

Upon receipt, and according to some example embodiments, the print engine 122 may execute the print command (s), or more specifically, rasterize and/or print an image based on the print command(s). In some embodiments, depending on the printer control language, the image may be rasterized for printing. In some embodiments, the print command(s) may be processed by the printing device 120 to print the desired output. The print command(s) may therefore signal to the print engine 122 settings defining the placement, style and content. An example label, including a barcode defined by custom HTML tags, such as those provided in the above HTML input, is shown in FIG. 12.

FIG. 4 is a flowchart illustrating operations for determining placement information and style information as is described with reference to operation 310. At operation 400, the print server 106 may include means, such as the processor 212, for converting the HTML input, to an Extensible Hypertext Markup Language (XHTML) document. Converting the HTML to XHTML may be desirable, in some example embodiments, because an XHTML document may be better suited for parsing and for format transformation. The conversion of the HTML to XHMTL includes, but is not limited to, repairing invalid HTML, improving the style of the HTML and/or the like. For example, illegal XML characters appearing in the content may be replaced by their Unicode equivalents (e.g., '&' may be replaced by '&'). Overlapping elements may be repaired and properly nested. Elements not properly terminated may be terminated, and/or attribute values may be properly enclosed in quotes. The XHTML may then be stored in memory 214.

Following conversion to XHTML, at operation 410, the processor 212 may generate element IDs for each element that may contain content or whose children elements may contain content. In this regard, content may include any information that may be printed. In subsequent operations, such as operations 430 and 550, as the inferred placement information is processed to produce absolute placement information, the element ID may be associated with the absolute placement information as to provide a means for referencing the correct placement information while formulating the printer commands. As such, the style information for each element may be generated in a separate, or in some embodiments, asynchronous process, and assigned the corresponding element ID. The element ID will allow for subsequent linkage of the placement information and style information to the content to be printed.

Element IDs may be created randomly, by processor 212, or the like, and, in some examples, may be stored in a hash set on memory 214. A hash set is an example data structure for storing the element IDs, which may prevent duplicate IDs from being added, however it will be appreciated that any data structure may be used to track creation of element IDs. By utilizing a hash set, if the processor 212 creates the same random ID twice, the hash set may reject the inclusion of the duplicate ID and force another random string to be generated and used as the ID. This process may repeat until an ID is successfully created and inserted into the hash set for each HTML element. The element IDs may be included in the XHTML document so that the elements may be distinguished and associated with style and placement information as described in subsequent operations hereinafter. In some example embodiments, a document object model (DOM) may be used to coordinate between the XHTML and XML documents generated herein using the element IDs. For example, the nodes of the DOM may be organized in a tree structure so that it can be parsed as is shown with reference to FIG. 5. Alternatively or additionally, the conversion to XHTML may occur in conjunction with the conversion of HTML to XHTML, as is described in operation 400.

In some example embodiments, and according to operation 420, the print server 106 may include means, such as processor 212, or the like, for generating a formatting object tree, such as an XSL-Formatting Object (XSL-FO), based on the XHTML and an input Extensible Stylesheet Language (XSL) template. In some example embodiments, the XSL template may be stored in the memory 214 and may be accessed or otherwise retrieved based on a type of a label to be printer, a user request, a default instruction, or the like. The XSL template may include logic and predefined attributes to define default parameters defining a style to apply to each HTML element in the XHTML, such as, but not limited to size (e.g., height and width), font, color and/or the like.

As such, the processor 212 of the print server 106 may be configured to apply the XSL template to each of the HTML elements in the XHTML, resulting in an XSL-FO template that includes style information to be applied to each of the HTML elements. In some example embodiments, the elements in the XSL-FO are linked or otherwise related to the HTML elements based on the element ID.

Continuing to operation 430, the print server 106 may include means, such as the processor 212, for extracting placement information from the XSL-FO, generated with respect to operation 420, for at least one portion of the content. The XSL-FO may lack absolute placement information, but may include the inferred placement information from the HTML input (or XHTML). In an example embodiment, the XSL-FO may be processed using a formatting objects processor (FOP), such as an Apache™ FOP, to calculate or otherwise render absolute placement information for each of the elements in the XSL-FO and return the absolute placement information in an XML placement document (e.g., XML area trees). In some example embodiments, the absolute placement information may be linked to or otherwise related to the HTML elements in the XHTML by the element IDs.

In some embodiments, the placement information may include at least one coordinate pair identifying a position on a two-dimensional axis that may be interpretable or otherwise useable by a printer control language, such as ZPL. Alternatively or additionally, in some instances, a coordinate pair for one or more elements may be provided, or hard-coded, in an HTML element, and, as such, coordinates for those elements need not formulated, but rather the hard-coded position information may be used from the HTML input. Following the processing of the XSL-FO, a resulting XML placement document providing the coordinates and corresponding element IDs may be stored on memory 214.

After generation of the absolute placement information, in some embodiments, the print server 106, such as with processor 212, may optionally incorporate the placement information into the XHTML document created with respect to operation 400, to generate an XHTML output, as shown at operation 440. The XHTML output may include absolute placement information, (e.g., position coordinates), as generated by processor 212 with respect to operation 420 and 430 above, as well as style information and content retained from the provided HTML input, for the purposes of or test print on a printing device. An example XHTML output generated from the HTML input, and having element identifiers and absolute placement information incorporated within is shown below:

XHTML output:
1) <html id="t61vK">
2) <head id="a0ZMW">
3) <META http-equiv="Content-Type" content="text/html; charset=UTF-8">
4) <meta content="text/html; charset=UTF-8" http-equiv="Content-Type" id="KOQcf">
5) <meta content="HTML Tidy for Java (vers. 26 Sep. 2004), see www.w3.org" id="gVKRA" name="generator">
6) <title id="jEriw"></title>
7) </head>
8) <body id="2R8oM" style="width:3.17 in; height:2.12 in; margin:1px; padding:0px; font-family: 'MyriadSet-Text'; font-size:9pt; margin-left:0.25 in;">
9) <div id="aouWL" style="width:202px; height:117px">
10) <p id="eKGs6">
11) <span id="o0qqg" pos="(0.25 in,0.37 in)" style="font-weight:bold; font-size:36px;">Zebra</span> <span id="JbZ9Q1UJaHN2cFv5Nrswl33qH" pos="(0.25 in,0.70 in)" style="font-weight:bold; font-size:20px; ">Custom Applications Group</span>
12) </p>
13) </div>
14) <div id="qdCFI" pos="(0.25 in,1.75 in)" style="font-family: Code39SmallHigh; font-size: 36px; height: 60px; padding-bottom: 1px; width: 600px">
15) <p id="99FDT1WpUYIPn9h9VJg25BM7ouJWaq" pos="(0.25 in,1.75 in)">*ZEBRACUSTOMAPPLICATIONSGROUP*</p>
16) </div>
17) </body></html>

It should be noted that the above line numbers have been added for purposes of referring to the XHTML code and should not be interpreted as being part of the XHTML code set forth above. In some example embodiments, the XHTML output may be processed by a rendering tool specific to the printing device 120, providing a print preview to a user. As such, a user may ensure the placement information has been correctly generated. By way of example, FIG. 11 provides a display following rendering of the XHTML output above by a rendering tool. Because absolute placement information (e.g., coordinates in the "pos" attribute) are provided in the XHTML output, during rendering by the rendering tool, the previously inferred placement of the HTML input is replaced by the absolute placement provided. For example, and with reference to line 11 of the XHTML output, the placement information, indicated by the "pos" attribute, provides coordinates for the associated element to be printed. A web browser rendering the HTML input may infer placement information of an element based on the sizing, alignment, number of parent and/or children elements, and/or document structure. As such, the XHTML output is configured to provide a more accurate print preview, or test print, including how the print server 106 and/or printing device 120 may interpret the placement information. It will be appreciated that in the example rendering of FIG. 11, the literal barcode content 1100 is displayed, however, in some embodiments, a rendering tool may identify a font associated with a barcode (e.g., font-family: Code39SmallHigh), and use the font to generate an image that substantially represents a printed barcode (not depicted in FIG. 11).

In some embodiments, based on the XHTML output, a user may adjust absolute placement information by manually overriding the attributes provided in the XHTML output, or altering inputs to any label generation software they may be utilizing. As such, changes to the absolute placement information may be incorporated into the HTML input, and may be provided back to the printer server 106 via communication interface 218, for example. Further detail regarding correction of absolute placement information is described with respect to FIG. 6.

By way of further example, and because FIGS. 8 and 9 appear identical, a user may feel confident that the placement information has been correctly extracted in operation 430 and correctly associated with the HTML elements in the HTML input.

FIG. 5 is a flowchart illustrating an example method for generating printer commands as is described in 320. Is some example embodiments, the printer commands are generated based on the content of the XHTML, HTML elements in the XHTML, style information stored in the formatting object tree (e.g., XSL-FO), and placement information stored in the XML placement document, such that, when printed on the printing device, the printer command(s) result in the printing of the content in the format, or style and placement, specified by the HTML, and in the position inferred from the HTML.

At operation 500, the print server 106, with processor 212, for example, may parse the elements of the XHTML, using the DOM, in order to parse or otherwise retrieve each of the elements. For example, each element in the HTML that contains content or whose children elements may contain content. At decision operation 510, processor 212 may identify an element type (e.g., barcode, text, image or the like) for the current element being processed. The element types depicted in FIG. 5 are provided as examples and it will be appreciated that any custom elements may be used in conjunction with the methods provided herein.

As is shown in operations 520, 530, and 540 the processor 212 is configured to generate printer commands based on the element type determined at decision operation 510. In some example embodiments, the printer command includes style information as well as placement information (e.g., operation 550), which are also to be included in the set of printer commands to be transmitted to the printer. In an instance in which the detected element signifies text, at operation 520, processor 212 is configured to reference an XSL-FO, such as the XSL-FO generated at operation 420, and generate printer commands that express the style information for the detected element.

In an instance in which the detected element signifies a barcode, at operation 530, the processor 212 is configured to reference a lookup table to identify characteristics of the barcode, such as barcode type, barcode width, and a barcode height needed to print the barcode, for example, based on the information in the detected element (e.g., font-size: 36px; height: 60px;). Any of the barcode characteristics may be used by the processor 212 to generate printer commands that may cause the barcode to be printed, such as the barcode 1200 of FIG. 12. The printed barcode may appear substantially similar to a barcode otherwise rendered in a browser using a barcode font, such as font-family:Code39SmallHigh, for example.

In an instance in which the detected element signifies an image, at operation 540, the processor 212 is configured to process images and generate the printer commands to enable printing of the image. For example, the ZPL command, "^GF" (signaling a graphic format), may be included in ZPL printer commands for printing an image. Additionally or alternatively, an HTML element representing an image may be dithered using the Floyd-Steinberg dithering algorithm, for example, and sent to the printer byte-by-byte. Resulting printer commands may therefore provide instructions for printing a payload that is the image.

In some embodiments, an image (in the form of printer commands) may be sent to the printer each time an image is referenced. In some cases, an image may be loaded onto the printer, such as in the case of a company logo or other frequently printed image. In such embodiments, an image identifier associated with the image may be stored on memory 214, indicating to the processor 212 that the byte-by-byte printer commands need not be generated because the image may be stored locally on the printing device 120. The printer command(s) may instead include reference to the image identifier, which may then be interpreted by the printing device 120 to retrieve the corresponding rasterized image from memory.

At operation 550, the processor 212 is configured to generate printer commands that incorporated the placement information for the detected element. In some example embodiments, the placement information may be derived from the XML placement document and associated based on the element ID. Once the placement information and the style information has been generated for the content related to the detected element as a printer command, the printer command may be added to a set of printer commands to be transmitted to the printer. In an example embodiment in which a user has provided corrected absolute placement information and provided it back to the print server 106 in the form of a subsequent HTML input, the absolute placement information may be taken directly from the HTML input, such as by identification of a "pos" attribute. In such a scenario, the processor 212 may utilize the provided absolute placement information instead of placement information generated from the processing of the XSL-FO. The correction of absolute placement information via a subsequent HTML input is described in further detail with respect to FIG. 6.

In an instance in which a raw printer command is detected in the XHTML then at operation 560, the raw printer command is added to the set of printer commands to be transmitted to the printer. For example, in some case printer commands, such as a ZPL command, may be included in the HTML input and may be indicated by a particular HTML element so that it is ignored by a browser. An example of a printer command that may be included in the HTML may be a repetitive portion of a label or other customized portions of the label.

In an instance in which an unsupported element type is detected, then the process loops back to operation 500. In some example embodiments, an unsupported element types may result in a warning for a user. As shown by operation 570, the parsing of the XHTML continues until every element in the XHTML, as represented in the DOM, is parsed.

While the flowcharts of FIGS. 3, 4, and 5 illustrate operations that may be performed by a print server 106, the flowcharts of FIGS. 6 and 7 illustrate operations that may be performed by a user terminal 110 and printing device 120, respectively. In FIG. 6, according to operation 600, the user terminal 110 may transmit content to be printed by a print device, in a format specified by HTML, to the print server 106. In some examples, the user terminal may generate label information to be printed in a format described by HTML and therefore may provide the print server with the HTML source code instead of, for example, a rendered image of the label to be printed. The print server 106 may receive and process the HTML, as described above with respect to FIGS. 3, 4, and 5.

In response to the processing of the HTML, at operation 610, the user terminal 110 may receive an XHTML output, as provided by the print server 106 according to operation 440. As is described with reference to operation 440, the XHTML output may contain absolute placement information that may be rendered by a printer-specific rendering tool so that a user can preview or otherwise interact with the content to be printed prior to sending the content to the printer. At operation 620, the user terminal 110 may utilize the printer-specific rendering tool to render the XHTML output on a display, providing a print preview to a user of the user terminal 110, such as the example XHTML output rendering described above with respect to FIG. 11.

In some embodiments, instead of, or in addition to processing the XHTML output by a rendering tool, a user may test the absolute placement information by printing a label represented by the XHTML output on the printing device 120 or test printer employing the same printer control language as printing device 120. As such, a test print based on the XHTML output may provide a user motivation to change or fine-tune the generated absolute position information.

At operation 630, the user terminal 110 may receive changes to the absolute placement information based on the rendering provided by the printer-specific rendering tool, and/or test print. For example, a user of user terminal 110 may view the rendering (e.g., print preview) and/or test print and indicate they would like to alter the placement information (e.g., "pos" coordinates), and provide the changes to the user terminal 110. The changes may be received by the user terminal 110 in the form of a subsequent HTML input. The subsequent HTML input may now include absolute placement information, or coordinates, to signal to the print server 106 to override placement information otherwise incorporated from the XML placement document. For example, line 8 of the HTML input provided above, originally absent of absolute placement information, may be replaced with the following line, now including user-provided "pos" coordinates:

<div pos="(0.25 in,1.75 in)"; id="barcode_holder" style="width:600px; height:60px">

At operation 640, the user terminal 110 may cause an approval to be transmitted to the print server 106 in an instance in which there are no changes to the placement information in operation 630 (signaling to the print server 106 to proceed with the generated absolute placement information). Otherwise, the user terminal 110 may transmit the subsequent, or corrected HTML input to the print server 106, for the subsequent HTML input to be re-processed by processor 212 (with respect to the operations of FIGS. 3-5. When performing operation 550, the print server 106 may now accept the provided absolute placement information for elements with "pos" attributes in the subsequent HTML input instead of the extracted placement information from the XML placement document, thereby allowing a user to "override" the extracted placement information In some embodiments, operations 610-640 of FIG. 6 may be repeated until a desired print preview or test print is achieved.

FIG. 7 is a flowchart illustrating operations to be performed by a printing device according to an example embodiment. At operation 700, printing device 120 may, for example, receive printer command(s), from printer server 106 and over network 100. The printer command(s) may, for example, be generated as a result of performance of operations of FIGS. 3, 4, and 5, by the print server 106. At operation 710, the printing device may execute the printer command(s), and as a result, rasterize an image including content in the style specified by the HTML, and in the position inferred from the HTML. As such, the printing device 120 may process the printer command(s) to rasterize a bitmap image. In some embodiments, the print engine 122 may instruct the printing device 120 to print the desired output, such as the example label of FIG. 12.

As described above, the functionalities provided by the claimed invention, for example, provide for efficient printing of highly precise barcode images. An additional advantage provided by the functionality described herein is that a user of the printing device 120 may request print jobs in standard HTML, a simple and structured markup language designed for displaying content on web browsers. Embodiments of the claimed invention may relieve the user, whether a third party system or user terminal 110, from conforming to the printer control language required by the printing device 120. Rather, users may utilize existing processes for generating HTML, and still obtain the desired print result. Upgrades or other changes to printing devices that may result in changes to the printer control language may require that the change to produce newly defined print commands be incorporated into the print server 106 or printing device 120, for a user to fully realize the benefits. Therefore, a third party system or device configured to provide HTML as input for a print job, need not adapt their software to conform to a changing interface.

It will be appreciated that the block diagrams of FIGS. 1 and 2 are example configurations of a printing system 101 and print server 106, and that the operations described above may be performed by various components of a printing system 101, and in various configurations. FIG. 8 is a block diagram representing a configuration of printing system 101 according to an example embodiment. HTML, provided by user terminal 110, may be provided to printer server 106, which may process the HTML according to any of the operations described above, and transmit print commands to the printing device 120. In FIG. 9, a user terminal 110 may provide HTML to a printing device 120, without the use of print server 106, in which case the printing device 120 may perform some of the operations described herein as being performed by the print server 106. In some embodiments, some operations described as being performed by the print server 106 may even be performed by user terminal 110. FIGS. 8 and 9 therefore provide additional example implementations of printing system 101, but it will be appreciated that numerous other configurations exist.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

That which is claimed:

1. A method comprising:
converting received Hypertext Markup Language (HTML) that specifies content to be printed by a printing device, to Extensible Hypertext Markup Language (XHTML), wherein at least one element in the XHTML is assigned an element identifier;
generating style information, based on an Extensible Stylesheet Language (XSL) template, for at least one element in the XHTML, wherein the style information is stored in a format object tree and is associated with the XHTML via the element identifier;

extracting placement information from the format object tree for at least one element, wherein the placement information is stored in an XML placement document and is associated with the XHTML via the element identifier; and generating at least one printer command that incorporates, based on the element identifier, the content from the XHTML, style information from the formatting object tree, and placement information from the XML placement document, wherein execution of the at least one printer command by a printing device results in rasterization of the content in the style specified by the HTML, and in the position derived from the HTML.

2. The method of claim 1, wherein the at least one printer command is generated remotely from the printing device, and the method further comprises:

transmitting the at least one printer command to the printing device.

3. The method of claim 1, wherein the placement information comprises at least one coordinate pair identifying a position on a two-dimensional axis and is interpretable by the printer control language.

4. The method of claim 1, wherein the at least one printer command is generated by parsing the XHTML into the printer control language and said parsing comprises:

referencing a custom element type in a lookup table to identify at least one command in the printer control language and associated with the element type.

5. The method of claim 1, further comprising:

detecting at least one element type indicating that the content includes a barcode;

identifying at least one barcode characteristic based on the XHTML; and referencing a barcode lookup table to generate style information based on the at least one barcode characteristic, wherein printing of the barcode content using the style information results in printing of the barcode.

6. The method of claim 5, wherein the at least one barcode characteristic is at least one of a barcode type, a barcode width, and a barcode height.

7. The method of claim 1, wherein the printer control language is Zebra Programming Language.

8. The method of claim 1, wherein the HTML comprises at least one command in the printer control language.

9. The method of claim 1, further comprising:

generating an XHTML output file including absolute placement information.

10. The method of claim 9, further comprising:

receiving a change in absolute placement information, provided by a user, for at least one element, in the form of subsequently received HTML.

11. The method of claim 1, further comprising:

receiving content to be printed by a printing device in a format specified by the HTML.

12. An apparatus comprising processing circuitry configured to cause the apparatus to at least:

convert received Hypertext Markup Language (HTML) that specifies content to be printed by a printing device, to Extensible Hypertext Markup Language (XHTML), wherein at least one element in the XHTML is assigned an element identifier;

generate style information, based on an Extensible Stylesheet Language (XSL) template, for at least one element in the XHTML, wherein the style information is stored in a format object tree and is associated with the XHTML via the element identifier;

extract placement information from the format object tree for at least one element, wherein the placement information is stored in an XML placement document and is associated with the XHTML via the element identifier; and generate at least one printer command that incorporates, based on the element identifier, the content from the XHTML, style information from the formatting object tree, and placement information from the XML placement document, wherein execution of the at least one printer command by a printing device results in rasterization of the content in the style specified by the HTML, and in the position derived from the HTML.

13. The apparatus of claim 12, wherein the at least one printer command is generated remotely from the printing device, and the processing circuitry is further configured to:

transmit the at least one printer command to the printing device.

14. The apparatus of claim 12, wherein the placement information comprises at least one coordinate pair identifying a position on a two-dimensional axis and is interpretable by the printer control language.

15. The apparatus of claim 12, wherein parsing the XHTML into the printer control language to generate the at least one printer command comprises:

referencing a custom element type in a lookup table to identify at least one command in the printer control language associated with the element type.

16. The apparatus of claim 12, wherein the processing circuitry is further configured to:

detect at least one element type indicating that the content includes a barcode;

identify at least one barcode characteristic based on the XHTML; and reference a barcode lookup table to generate style information based on the at least one barcode characteristic, wherein printing of the barcode content using the style information results in printing of the barcode.

17. The apparatus of claim 16, wherein the at least one barcode characteristic is at least one of a barcode type, a barcode width, and a barcode height.

18. The apparatus of claim 12, wherein the printer control language is Zebra Programming Language.

19. The apparatus of claim 12, wherein the HTML comprises at least one command in the printer control language.

20. The apparatus of claim 12, wherein the processing circuitry is further configured to:

generate an XHTML output file including absolute placement information.

21. The apparatus of claim 20, wherein the processing circuitry is further configured to:

receive a change in absolute placement information, provided by a user, for at least one element, in the form of subsequently received HTML.

22. The apparatus of claim 12, wherein the processing circuitry is further configured to:

receive content to be printed by a printing device in a format specified by the HTML.

23. A computer program product comprising at least one non-transitory computer-readable medium having computer-readable program instructions stored therein, the computer-readable program instructions comprising instructions, which, when performed by an apparatus, are configured to cause the apparatus to at least:

convert received Hypertext Markup Language (HTML) that specifies content to be printed by a printing device, to Extensible Hypertext Markup Language (XHTML), wherein at least one element in the XHTML is assigned an element identifier;

generate style information, based on an Extensible Stylesheet Language (XSL) template, for at least one element in the XHTML, wherein the style information is stored in a format object tree and is associated with the XHTML via the element identifier;

extract placement information from the format object tree for at least one element, wherein the placement information is stored in an XML placement document and is associated with the XHTML via the element identifier; and generate at least one printer command that incorporates, based on the element identifier, the content from the XHTML, style information from the formatting object tree, and placement information from the XML placement document, wherein execution of the at least one printer command by a printing device results in rasterization of the content in the style specified by the HTML, and in the position derived from the HTML.

24. The computer program product of claim 23, wherein the at least one printer command is generated remotely from the printing device, and the computer-readable program instructions further comprise instructions, which, when performed by an apparatus, are configured to cause the apparatus to at least:
transmit the at least one printer command to the printing device.

25. The computer program product of claim 23, wherein the placement information comprises at least one coordinate pair identifying a position on a two-dimensional axis and is interpretable by the printer control language.

26. The computer program product of claim 23, wherein parsing the XHTML into the printer control language to generate the at least one printer command comprises:
referencing a custom element type in a lookup table to identify at least one command in the printer control language and associated with the element type.

27. The computer program product of claim 23, wherein the computer-readable program instructions further comprise instructions, which, when performed by an apparatus, are configured to cause the apparatus to at least:
detect at least one element type indicating that the content includes a barcode;
identify at least one barcode characteristic based on the XHTML; and
reference a barcode lookup table to generate style information based on the at least one barcode characteristic, wherein printing of the barcode content using the style information results in printing of the barcode.

28. The computer program product of claim 27, wherein the at least one barcode characteristic is at least one of a barcode type, a barcode width, and a barcode height.

29. The computer program product of claim 23, wherein the printer control language is Zebra Programming Language.

30. The computer program product of claim 23, wherein the HTML comprises at least one command in the printer control language.

31. The computer program product of claim 23, wherein the computer-readable program instructions further comprise instructions, which, when performed by an apparatus, are configured to cause the apparatus to at least:
generate an XHTML output file including absolute placement information.

32. The computer program product of claim 31, wherein the computer-readable program instructions further comprise instructions, which, when performed by an apparatus, are configured to cause the apparatus to at least:
receive a change in absolute placement information, provided by a user, for at least one element, in the form of subsequently received HTML.

33. The computer program product of claim 23, wherein the computer-readable program instructions further comprise instructions, which, when performed by an apparatus, are configured to cause the apparatus to at least:
receive content to be printed by a printing device in a format specified by the HTML.

* * * * *